(12) United States Patent
Tamao et al.

(10) Patent No.: US 12,367,721 B2
(45) Date of Patent: Jul. 22, 2025

(54) VEHICLE INFORMATION MANAGEMENT DEVICE, VEHICLE INFORMATION MANAGEMENT METHOD, AND STORAGE MEDIUM

(71) Applicant: TOYOTA JIDOSHA KABUSHIKI KAISHA, Toyota (JP)

(72) Inventors: Junichiro Tamao, Tokyo (JP); Takahiro Utsunomiya, Tokyo (JP); Tomoaki Karasawa, Matsudo (JP); Takumi Horie, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 18/504,624

(22) Filed: Nov. 8, 2023

(65) Prior Publication Data

US 2024/0185653 A1 Jun. 6, 2024

(30) Foreign Application Priority Data

Dec. 1, 2022 (JP) ................. 2022-192905

(51) Int. Cl.
*G07C 5/08* (2006.01)
(52) U.S. Cl.
CPC .................... *G07C 5/085* (2013.01)

(58) Field of Classification Search
CPC ...... G07C 5/085; G06F 11/3013; G06F 12/00
See application file for complete search history.

(56) References Cited

U.S. PATENT DOCUMENTS

| | | | |
|---|---|---|---|
| 2019/0258522 A1 | 8/2019 | Tanba et al. | |
| 2021/0157902 A1* | 5/2021 | Sakurai | G06F 21/57 |
| 2021/0182048 A1* | 6/2021 | Harata | B60W 50/14 |
| 2023/0005305 A1* | 1/2023 | Sakurai | G06F 13/00 |

FOREIGN PATENT DOCUMENTS

JP 2019-144816 A 8/2019

* cited by examiner

*Primary Examiner* — Behrang Badii
(74) *Attorney, Agent, or Firm* — Oblon, McClelland, Maier & Neustadt, L.L.P.

(57) ABSTRACT

A vehicle information management device, a vehicle information management method, and a storage medium are provided. Execution circuitry writes data to a memory in conjunction with execution of each of multiple applications. The execution circuitry determines whether the remaining number of writable times to the memory has become a prescribed value or less. When the determination is affirmative, the execution circuitry reduces a write frequency of data to the memory in conjunction with execution of each application of the entirety of the applications, as compared with the write frequency of data in a case in which the determination is negative.

7 Claims, 2 Drawing Sheets

VEHICLE INFORMATION MANAGEMENT DEVICE, VEHICLE INFORMATION MANAGEMENT METHOD, AND STORAGE MEDIUM

BACKGROUND

1. Field

The present disclosure relates to a vehicle information management device, a vehicle information management method, and a storage medium.

2. Description of Related Art

The information processing device disclosed in Japanese Laid-Open Patent Publication No. 2019-144816 includes a central processing unit (CPU) and a memory. The CPU performs various kinds of software. In addition, the CPU writes various data to the memory in conjunction with execution of the software. The CPU counts the number of write completion times in the memory in a certain specific period for each piece of software.

Then, when the total number of write completion times of all the software reaches a specific number of times, the CPU changes the setting of the software having the largest number of write completion times during this specific period. As a result, the CPU reduces a write frequency of the software having the largest number of write completion times.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a vehicle information management device includes execution circuitry and a memory. The memory stores multiple applications. The memory has a number of writable times of data to the memory. The execution circuitry is configured to write the data to the memory in conjunction with execution of each of the applications. The execution circuitry is also configured to make a determination as to whether a remaining number of writable times to the memory has become a prescribed value or less. The execution circuitry is further configured to, when the determination is affirmative, reduce a write frequency of data to the memory in conjunction with the execution of each application of the entirety of the applications, as compared with the write frequency in a case in which the determination is negative.

In a second general aspect, a non-transitory computer-readable storage medium stores a program for causing execution circuitry of a vehicle information management device to execute a vehicle information management process. The vehicle information management process includes writing data to a memory of the vehicle information management device in conjunction with execution of each of multiple applications, the memory storing the applications. The vehicle information management process also includes determining whether a remaining number of writable times to the memory has become a prescribed value or less. The vehicle information management process further includes reducing, when the determination is affirmative, a write frequency of the data to the memory in conjunction with the execution of each application of the entirety of the applications, as compared with a write frequency in a case in which the determination is negative.

In a third general aspect, a vehicle information management method causing execution circuitry of a vehicle information management device to write data to the memory of the vehicle information management device in conjunction with execution of each of multiple applications, the memory storing the applications. The method also causes the execution circuitry to determine whether a remaining number of writable times to the memory has become a prescribed value or less. The method further causes the execution circuitry to reduce, when the determination is affirmative, a write frequency of the data to the memory in conjunction with the execution of each application of the entirety of the applications, as compared with a write frequency in a case in which the determination is negative.

In each of the above configurations, when the remaining number of writable times to the memory, as a storage unit, decreases, the number of write completion times to the memory is reduced not only for an application having a large number of write completion times, but also for multiple applications as a whole. Therefore, even when the remaining number of writable times to the memory decreases, the time until the number of write completion times reaches an upper limit number of times is extended.

Even if a write frequency by a specific software to a memory is reduced as in the above document, other software can still continue writing to the memory. Therefore, the write frequency to the memory does not necessarily decrease when considering the entirety of multiple pieces of software. Each of the above configurations may improve such a situation.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a vehicle information management device, a vehicle information management method, a vehicle information management process, and a storage medium according to an embodiment of the present disclosure will be described with reference to FIGS. 1 to 4.

Overall Configuration of Vehicle

Figure 1:
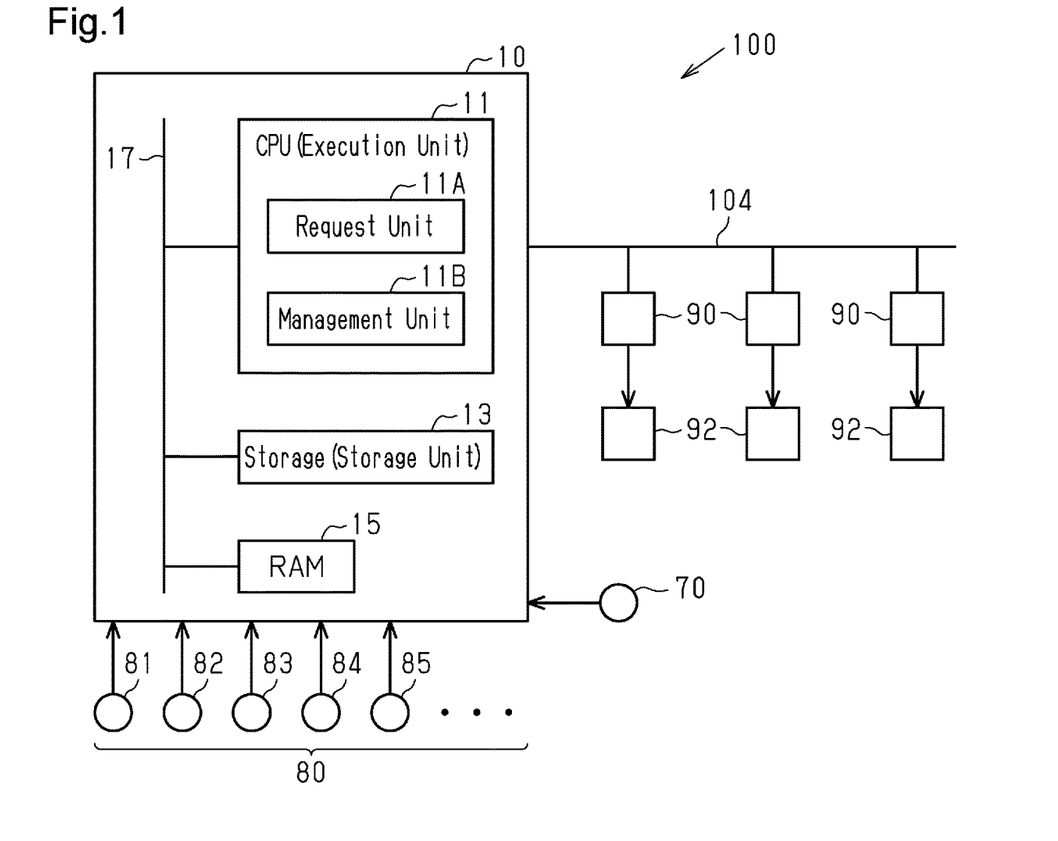
FIG. 1 is a schematic diagram showing a configuration of a vehicle.

As illustrated in FIG. 1, a vehicle 100 includes a central controller 10 and multiple specific controllers 90. The central controller 10 is a controller that controls the entire vehicle 100 in a centralized manner. Each of the specific controller 90 is a controller that controls a specific one of multiple vehicle on-board devices 92. The vehicle on-board devices 92 include a device for accelerating or braking the vehicle 100. One of the vehicle on-board devices 92 is an engine serving as a drive source of the vehicle 100. One of the vehicle on-board devices 92 is a hydraulic brake device. There are many other vehicle on-board devices 92. The central controller 10 and the specific controllers 90 can communicate with each other via an external bus 104.

The vehicle 100 includes a sensor group 80 including multiple sensors. The sensors obtain various types of information. The various types of information include information on monitored surroundings of the vehicle 100, information on a traveling state of the vehicle 100, information on an operating state of the vehicle on-board device 92, and the like. One of the sensors is an image sensor 81 built in a vehicle on-board camera. The image sensor 81 detects light. The vehicle on-board camera captures images of the surroundings of the vehicle 100 by using a function of the image sensor 81. The captured images of the vehicle on-board camera include data detected by the image sensor 81. One of the sensors is a wheel speed sensor 82 that detects a rotation speed of a wheel of the vehicle 100. The wheel speed sensor 82 is also a sensor that detects a traveling speed of the vehicle 100. One of the sensors is a brake pressure sensor 83 that detects hydraulic pressure of a brake device. The sensors include a device that receives a radio wave from the outside of the vehicle 100. That is, one of the sensors is a first receiver 84 that receives traffic information including congestion information from an external server. In addition, one of the sensors is a second receiver 85 that receives information on the current position coordinates of the vehicle 100 from a global positioning satellite. In addition to the above, the sensor group 80 includes various sensors. Each sensor is connected to the central controller 10 in a wired or wireless manner. Each sensor repeatedly transmits a signal corresponding to information detected or received by the sensor itself to the central controller 10.

The vehicle 100 includes a start switch 70. The start switch 70 is a switch for an occupant to instruct activation of the vehicle 100. The start switch 70 is turned on or off depending on an operation of the occupant. The start switch 70 transmits a signal corresponding to the operation state of the occupant to the central controller 10.

Overall Configuration of Central Controller

The central controller 10 includes a CPU 11, a storage 13, and a random-access memory (RAM) 15. The CPU 11 is execution circuitry as an execution unit. The storage 13 is a nonvolatile memory that is electrically rewritable. The storage 13 is a memory as a storage unit. The RAM 15 is a volatile memory that temporarily stores data when the CPU 11 performs processing. The CPU 11, the storage 13, and the RAM 15 can communicate with each other via an internal bus 17. The central controller 10 including the CPU 11, the storage 13, and the like is a vehicle information management device. Although not illustrated, similarly to the central controller 10, each specific controller 90 includes a CPU, a storage, and the like.

The storage 13 stores multiple applications in advance. The applications are, for example, various programs for control or management. The CPU 11 executes an application stored in the storage 13. As a result, the CPU 11 performs various processes. Each application is assigned with an individual identification number.

Application

The applications stored in the storage 13 can be roughly classified into three types: first type applications, second type applications, and third type applications. The first type applications are applications for controlling acceleration or braking of the vehicle 100. The first type applications are also applications that need to successively write various types of data to the storage. The first type applications include an application for achieving a function of an advanced driver assist system. That is, one of the first type applications is an application for performing follow-up traveling while maintaining a constant distance from a preceding vehicle. One of the first type applications is an application for automatically braking to reduce damage of a collision to the vehicle 100. There are other first type applications. When the first type applications are executed, the CPU 11 writes, for example, a target value of control calculated in the past to the storage 13, in addition to data obtained by various sensors such as captured images of the camera, the traveling speed of the vehicle 100, and the hydraulic pressure of the brake device. The CPU 11 requests the engine and the brake device to accelerate or decelerate on the basis of the data. The first type applications correspond to specific applications.

The second type applications are applications that are not related to the control of acceleration or braking of the vehicle 100, and are applications that need to repeatedly write data detected or received by a sensor to the storage 13 at certain time intervals. One of the second type applications is a driving scoring application for scoring driving skills of an occupant. When the driving scoring application is executed, the CPU 11 repeatedly writes captured images of the camera to the storage 13. One of the second type applications is an unevenness monitoring application for monitoring unevenness of the road surface on which the vehicle 100 is traveling. When the unevenness monitoring application is executed, the CPU 11 repeatedly writes the rotation speed of the wheel to the storage 13. The rotation speed of the wheel is an index indicating the unevenness of the road surface. One of the second type applications is an application for displaying congestion information around the current position of the vehicle 100 on a display in the passenger compartment. When the congestion application is executed, the CPU 11 repeatedly writes the congestion information to the storage 13. There are other second type applications.

The third type applications are applications other than the first type applications and the second type applications. One of the third type applications is an information management application for managing information on the storage 13.

When executing the above information management application, the CPU 11 functions as a management unit 11B that manages information on the storage 13. On the other hand, when executing the first type applications or the second type applications, the CPU 11 functions as a request unit 11A that requests the management unit 11B to write to the storage 13.

Outline of Processes Executed by Request Unit and Management Unit

The management unit 11B can execute a write process. In the write process, the management unit 11B writes data to the storage 13 as the request unit 11A executes the first type application or the second type application. In the write process, the management unit 11B also updates the number of write completion times in the storage 13. The number of write completion times corresponds to the number of times of having written, in the same memory cell, some information including data in conjunction with execution of the application. Therefore, the writing here includes not only writing information to an empty memory cell but also overwriting a storage content of the memory cell to which information has already been written. For example, in a case in which writing is sequentially performed to each memory cell, when writing to all the memory cells is completed, the number of write completion times increases by one. The management unit 11B stores the number of write completion times from the time when the storage 13 is new in the storage 13. The management unit 11B updates a value stored in the storage 13 as needed.

The management unit 11B can execute a setting process. The setting process is a process for setting a designation flag F. The designation flag F is a flag for designating a generation mode when the request unit 11A generates data in conjunction with the execution of the application. The management unit 11B performs a first determination and a second determination as a premise of setting the designation flag F. In the first determination, the management unit 11B determines whether the remaining number of writable times KC to the storage 13 (hereinafter, simply referred to as the remaining number of writable times KC) is less than or equal to a first prescribed value K1. In the second determination, the management unit 11B determines whether the remaining number of writable times KC is less than or equal to a second prescribed value K2. The management unit 11B sets the designation flag F depending on determination results of the first determination and the second determination. The first prescribed value K1 is determined in advance as a maximum value for which time until the number of write completion times in the storage 13 reaches an upper limit number of times needs to be increased. The first prescribed value K1 is, for example, a value of 20% of the upper limit number of times. The second prescribed value K2 is a value less than the first prescribed value K1. The second prescribed value K2 is predetermined as a maximum value for which data other than data necessary for traveling of the vehicle 100 is not allowed to be written. The second prescribed value K2 is, for example, a value of 10% of the upper limit number of times. The storage 13 stores the first prescribed value K1 and the second prescribed value K2 in advance. The upper limit number of writes to the storage 13 is the number of writes that can be performed in one memory cell or a predetermined memory frame. Therefore, the total amount of data that can be written to the storage 13 including data overwriting is a value obtained by multiplying the number of memory cells or memory frames by the capacity of the memory cells or memory frames and the number of writable times. The storage 13 stores the upper limit number of times in advance.

The request unit 11A can execute a selection process. The selection process is a process for selecting a data generation mode in conjunction with the execution of an application.

The management unit 11B designates a generation mode to the request unit 11A through setting of the designation flag F described above. As a result, when the first determination or the second determination is affirmative, the management unit 11B reduces a write frequency of data to the storage 13 in the entire applications stored in the storage 13 as compared with a case in which the first determination is negative. Specifically, in a case in which the first determination is affirmative and the second determination is negative, the management unit 11B extends a time interval when repeatedly writing data to the storage 13 in conjunction with the execution of an application as compared with a case in which the first determination is negative. Furthermore, when the second determination is affirmative, the management unit 11B prohibits writing of data to the storage 13 in conjunction with the execution of the application. The management unit 11B imposes such a write restriction on applications other than the first type applications. Specifically, the management unit 11B imposes the write restriction only on the second type applications.

Specific Processing Procedure of Write Process

A specific processing flow of the write process will be described. As a premise, the request unit 11A generates data to be written to the storage 13 during the execution of the first type application or the second type application. Generating data includes obtaining data detected or received by a sensor mounted on the vehicle 100 at a necessary time interval. Generating data includes calculating a controlled variable for the vehicle on-board device 92.

Figure 2:
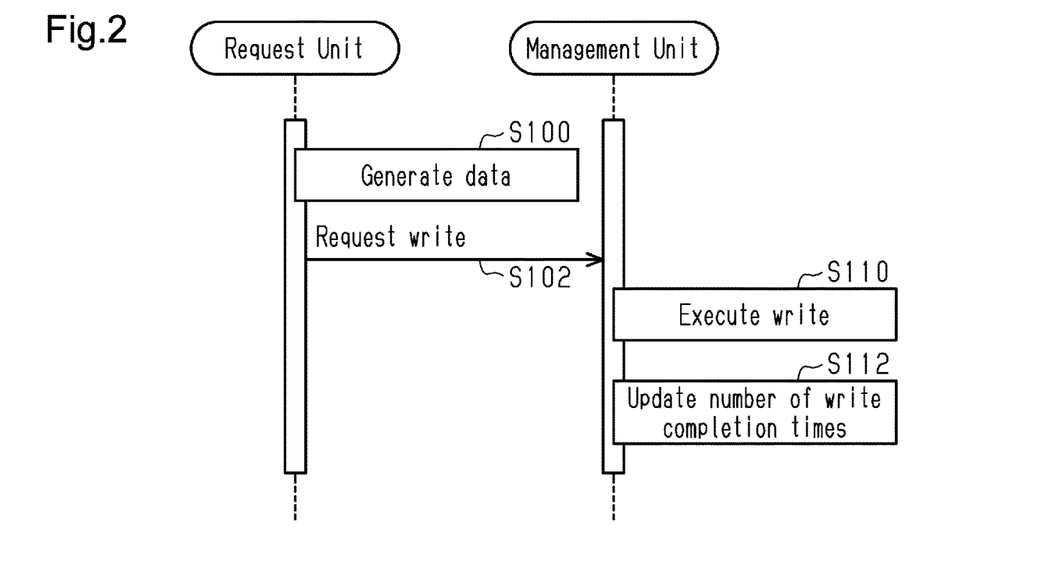
FIG. 2 is a sequence chart showing a flow of writing data in the vehicle shown in FIG. 1.

As illustrated in FIG. 2, in step S100, the request unit 11A generates one piece of data to be written to the storage 13 by using, for example, obtainment of a captured image as a trigger at a certain point in time. Thereafter, the request unit 11A performs the process of step S102. In step S102, the request unit 11A requests the management unit 11B to write data. In response to this request, the management unit 11B performs the write process. That is, in step S110, the management unit 11B writes, to the storage 13, the data requested to be written. Thereafter, in step S112, the management unit 11B updates the number of write completion times in the storage 13. Specifically, the management unit 11B calculates the number of writing completion times corresponding to the process of step S112 as a new number of times. Then, the management unit 11B adds the new number of times to the previous value for the number of write completion times stored in the storage 13 at the present time. Then, the management unit 11B overwrites the previous value with a new number of write completion times. The processes of steps S110 and S112 described above are the write process. The management unit 11B performs such a write process for one piece of data once. Although only one cycle of the write process is illustrated here, the management unit 11B performs the write process each time a write request of data is made. That is, when the request unit 11A repeatedly makes a write request of data, the management unit 11B repeats the write process. The request unit 11A may execute applications in parallel. Also, in this case, the management unit 11B sequentially performs the write process on each piece of data for which the write request has been made so that all the write requests can be met.

Specific Processing Procedure of Setting Process

Figure 3:
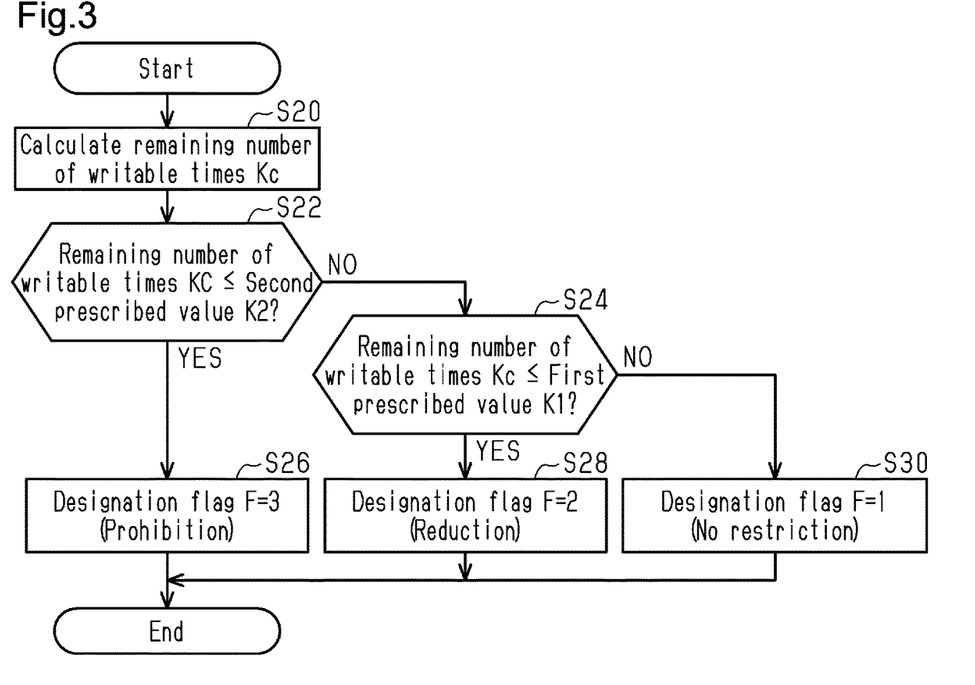
FIG. 3 is a flowchart related to the flow shown in FIG. 2, illustrating a processing procedure of a flag setting process.

When the start switch 70 is switched from off to on, the management unit 11B starts the setting process. As illustrated in FIG. 3, when starting the setting process, the management unit 11B first performs the process of step S20. In step S20, the management unit 11B calculates the remaining number of writable times KC. Specifically, the management unit 11B calculates, as the remaining number of writable times KC, a value obtained by subtracting the number of write completion times currently stored in the storage 13 from the upper limit number of times stored in the storage 13. Thereafter, the management unit 11B advances the process to step S22.

In step S22, the management unit 11B determines whether the remaining number of writable times KC is less than or equal to the second prescribed value K2. When the remaining number of writable times KC is greater than the second prescribed value K2 (step S22: NO), the management unit 11B advances the process to step S24.

In step S24, the management unit 11B determines whether the remaining number of writable times KC is less than or equal to the first prescribed value K1. When the remaining number of writable times KC is greater than the first prescribed value K1 (step S24: NO), the management unit 11B advances the process to step S30. Then, in step S30, the management unit 11B sets the designation flag F to 1. The fact that the designation flag F is 1 means that there is no restriction on the writing of data to the storage 13 in conjunction with the execution of the application. When setting the designation flag F, the management unit 11B overwrites a value of the designation flag F currently stored in the storage 13. After executing the process of step S30, the management unit 11B ends a series of processes of the setting process.

On the other hand, in step S24, when the remaining number of writable times KC is less than or equal to the first prescribed value K1 (step S24: YES), the management unit 11B advances the process to step S28. Then, in step S28, the management unit 11B sets the designation flag F to 2. The fact that the designation flag F is 2 means that it is necessary to reduce the write frequency of data to the storage 13 with the execution of the application. After executing the process of step S28, the management unit 11B ends a series of processes of the setting process.

On the other hand, in step S22, when the remaining number of writable times KC is less than or equal to the second prescribed value K2 (step S22: YES), the management unit 11B advances the process to step S26. Then, in step S26, the management unit 11B sets the designation flag F to 3. The fact that the designation flag F is 3 means that writing of data to the storage 13 with the execution of the application is prohibited. After executing the process of step S26, the management unit 11B ends a series of processes of the setting process.

Specific Processing Procedure of Selection Process

Figure 4:
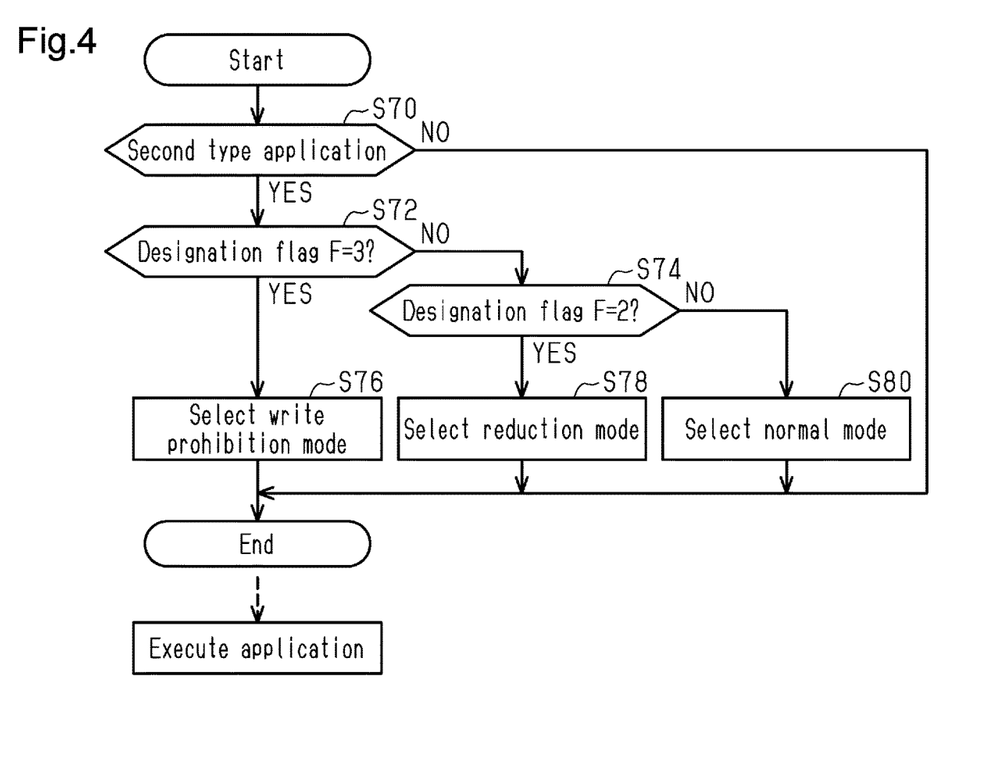
FIG. 4 is a flowchart subsequent to FIG. 3, illustrating a processing procedure of a selection process of a data writing mode.

When an execution condition of any one of the first type applications or any one of the second type applications is met, the request unit 11A performs a selection process prior to execution of an application for which the execution condition is met.

As illustrated in FIG. 4, when starting the selection process, the request unit 11A first performs the process of step S70. In step S70, the request unit 11A determines whether an application for which the execution condition is met is the second type application. The request unit 11A performs this determination by referring to a management table stored in the storage 13. The management table is a table representing a relationship between the identification numbers of applications and the types of the applications. As described above, the second type application is an application not related to a control of acceleration or braking of the vehicle 100.

In step S70, when the application for which the execution condition is met is the second type application (step S70: YES), the request unit 11A advances the process to step S72. In step S72, the request unit 11A determines whether the designation flag F is 3. In step S72, when the designation flag F is not 3 (step S72: NO), the request unit 11A advances the process to step S74.

In step S74, the request unit 11A determines whether the designation flag F is 2. In step S72, when the designation flag F is not 2 (step S74: NO), the request unit 11A advances the process to step S80. That is, the case in which the process is advanced to step S80 is a case in which the designation flag F is 1.

In step S80, the request unit 11A selects a normal mode as a data generation mode in conjunction with the execution of the second type application. As described above, the second type application is an application for which data from a sensor needs to be repeatedly written to the storage 13 at regular time intervals. The above normal mode is a mode in which a basic time interval is used as a prescribed time interval that is a time interval of writing to the storage 13. The basic time interval is a time interval of writing that is originally designated by a target application. Therefore, in a case in which the normal mode is selected, when an application is actually executed thereafter, the request unit 11A executes the target application as usual. The basic time interval is different for each application. After executing the process of step S80, the request unit 11A ends the selection process. Then, the request unit 11A executes, in the normal mode, the second type application for which the execution condition is met.

On the other hand, in step S74, when the designation flag F is 2 (step S74: YES), the request unit 11A advances the process to step S78. In step S78, the request unit 11A selects a write reduction mode as a data generation mode in conjunction with the execution of the application. The write reduction mode is a mode in which the write reduction time interval is used as the above prescribed time interval. In a case in which the write reduction mode is selected, when an application is actually executed thereafter, the request unit 11A executes the application by replacing the basic time interval originally designated in the application with the write reduction time interval. In the present embodiment, the request unit 11A sets a value obtained by multiplying the basic time interval of a target application by several times as the write reduction time interval. That is, the write reduction time interval is longer than the basic time interval. After executing the process of step S78, the request unit 11A ends the selection process. Then, the request unit 11A executes, in the write reduction mode, the second type application for which the execution condition is met.

In step S72, when the designation flag F is 3 (step S72: YES), the request unit 11A advances the process to step S76. In step S76, the request unit 11A selects a write prohibition mode as a data generation mode in conjunction with the execution of the second type application. In a case in which the write prohibition mode is selected, when the application is actually executed thereafter, the request unit 11A executes the application while canceling generation of data originally designated in the application. After executing the process of step S76, the request unit 11A ends the selection process. Then, the request unit 11A executes, in the write prohibition mode, the second type application for which the execution condition is met. In a case in which the second type application for which the execution condition is met does not have a function other than data generation, the execution of the second type application is substantially canceled in the write prohibition mode.

Meanwhile, in step S70, when an application for which the execution condition is met is the first type application (step S70: NO), the request unit 11A ends the selection process. Then, the request unit 11A executes the first type application as usual. That is, the request unit 11A executes the first type application as usual, which is an application for controlling acceleration or braking of the vehicle 100, regardless of the mode designated by the designation flag F. Therefore, in the present embodiment, the request unit 11A and the management unit 11B reduce the write frequency of data to the storage 13 or prohibit writing of data, only for the second type application.

Operation of Embodiment

Each time the start switch 70 is switched from off to on, the management unit 11B sets the designation flag F depending on the remaining number of writable times KC at that time. Regardless of the value to which the designation flag F is set, the request unit 11A executes the first type application as usual. Then, the management unit 11B writes data to the storage 13 in response to a request from the request unit 11A. On the other hand, the request unit 11A changes the data generation mode for the second type application depending on a value of the designation flag F. In accordance with this change, the write frequency as a frequency at which the management unit 11B writes data to the storage 13 also changes. This point will be described in detail below.

A case will now be discussed in which the remaining number of writable times KC is greater than the first prescribed value K1 (step S22: NO, and step S24: NO). In this case, the management unit 11B sets the designation flag F to 1 (step S30). In a case in which the driving scoring application, which is one of the second type applications, is executed under this situation, the request unit 11A selects the normal mode (step S80). In this case, the management unit 11B writes captured images to the storage 13 at the basic time intervals of the driving scoring application in response to the request of the request unit 11A. Even when the request unit 11A executes each of the other second type applications, the management unit 11B writes necessary data in the storage 13 at the basic time intervals of the corresponding application.

A case will now be discussed in which the remaining number of writable times KC eventually becomes less than or equal to the first prescribed value K1 and greater than the second prescribed value K2, as the number of write completion times in the storage 13 gradually increases (step S22: NO, step S24: YES). In this case, the management unit 11B sets the designation flag F to 2 (step S28). In a case in which the driving scoring application is executed under this situation, the request unit 11A selects the write reduction mode (step S78). In this case, the management unit 11B writes a captured image to the storage 13 at a time interval longer than the basic time interval of the driving scoring application in response to the request of the request unit 11A. Even when the request unit 11A executes each of the other second type applications, the management unit 11B writes necessary data in the storage 13 at a time interval longer than the basic time interval of the corresponding application. In this manner, the management unit 11B extends the write time interval of data for all the second type applications stored in the storage 13. That is, when the first determination is affirmative and the second determination is negative, the management unit 11B reduces, for all the second type applications, the write frequency of data to the storage 13 with the execution of each of the second type applications as compared with the write frequency when the first determination is negative.

A case will now be discussed in which the remaining number of writable times KC becomes less than or equal to the second prescribed value K2 as the number of write completion times in the storage 13 further increases (step S22: YES). In this case, the management unit 11B sets the designation flag F to 3 (step S26). In a case in which the driving scoring application is executed under this situation, the request unit 11A selects the write prohibition mode (step S76). In this case, the management unit 11B does not write data to the storage 13. Even when the request unit 11A executes each of the other second type applications, the management unit 11B does not write data to the storage 13. In this manner, the management unit 11B prohibits writing of data for all the second type applications stored in the storage 13. That is, when the second determination is affirmative, the management unit 11B reduces the write frequency of data to the storage 13 to 0 for all the second type applications.

Advantages of Embodiment (1) In the present embodiment, in a case in which the remaining number of writable times KC decreases, for example, the write frequency to the storage 13 is reduced for not only the application having a large number of write completion times but also all the second type applications. As a result, it is possible to reduce the write frequency of data to the storage 13 in conjunction with execution of each application of the entirety of the applications stored in the storage 13 including both the first type applications and the second type applications. Therefore, even when the remaining number of writable times KC to the memory decreases, the time until the number of write completion times reaches an upper limit number of times is extended.

(2) In the present embodiment, when the remaining number of writable times KC decreases to some extent, the write time interval for repeatedly writing data to the storage 13 is extended for the second type applications. As a result, it is possible to reduce the number of write completion times of writing data in the storage 13 in a certain period. That is, the write frequency of data to the storage 13 can be reduced.

(3) In the present embodiment, when the remaining number of writable times KC becomes considerably small, writing of data to the storage 13 is prohibited for the second type applications. In this case, there is no writing of data to the storage 13 in conjunction with the execution of the second type application. Therefore, it is possible to effectively reduce a write frequency of data in a case of considering the entire applications stored in the storage 13. The second type application is an application not related to a control of acceleration or braking of the vehicle 100. Therefore, even if the writing of data to the storage 13 in conjunction with the execution of the second type application is eliminated, basic motion performance such as traveling and stopping of the vehicle 100 is not affected.

(4) In the present embodiment, write restriction of data is not imposed on the first type applications. That is, even when the remaining number of writable times KC decreases, data necessary for the traveling of the vehicle 100 can be written to the storage 13 as usual. Then, the write restriction of data is imposed on the second type applications. By adopting such a method, it is possible to reduce the write frequency of data as the entire application stored in the storage 13 without reducing the write frequency of data necessary for the traveling of the vehicle 100.

Modifications

The above embodiment can be modified as follows. The above embodiment and the following modifications can be implemented in combination with each other as long as they are not technically inconsistent.

An execution point in time of the setting process is not limited to the point in time at which the start switch 70 is switched to on. For example, the setting process may be performed at predetermined constant time intervals. The setting process only need to be executed at an appropriate point in time so that an appropriate write restriction can be imposed while the number of executions of the setting process is reduced as much as possible. Reducing the number of executions of the setting process contributes to reducing the processing load on the CPU 11.

The information to be set in the designation flag F is not limited to the example of the above embodiment. It suffices if information with which a generation mode to be designated is obtained.

The method of determining the write reduction time interval is not limited to the example of the above embodiment. The write reduction time interval may be longer than the basic time interval of a target application. A method of setting the write reduction time interval may be changed for each application. For example, an application with a shorter basic time interval may have a larger change amount from the basic time interval.

The manner of reducing the write frequency of data by the write reduction mode is not limited to extending the write time interval of data as in the above embodiment. For example, the amount of data per write action of data written to the storage 13 in conjunction with the execution of the application may be reduced as compared with the normal mode. The amount of data written to the storage 13 when an application is executed in the normal mode is referred to as a basic amount. In the write reduction mode, it is conceivable, for example, to generate data having an amount of several tens of percent of the basic amount and to write the data to the storage 13. If the data to be written is, for example, a captured image, the amount of data can be reduced by lowering the image quality. Reducing the amount of data per write action of data means reducing the number of memory cells to which the write action is performed. If the number of memory cells to be written per one time is small, the write frequency of data for a certain memory cell is reduced. In this way, reducing the write frequency of data at a memory cell level is also effective in reducing the write frequency of data to the storage 13. The manner of the present modification for reducing the amount of data is effective not only in applications in which the write time interval of data to the storage 13 is constant but also in applications in which the time interval is not constant.

Extending the write time interval of data as in the above embodiment is referred to as a first write reduction method. Reducing the amount of data per write action of data as in the above modification is referred to as a second write reduction method. When one application is executed in the write reduction mode, both the first write reduction method and the second write reduction method may be applied to the application. That is, the write time interval of data may be extended, and the amount of data per write action of data may be reduced. Which one of the first write reduction method and the second write reduction method is to be performed may be selected depending on the application. It suffices if an appropriate manner is implemented in consideration of the type of data generated in conjunction with the execution of the application.

In the above embodiment, a two-stage write restriction is set by using the first determination and the second determination. Instead of this form, the write restriction may be set in three or more stages. Furthermore, the write frequency of data to the storage 13 may be gradually reduced. The contents of the setting process and the selection process may be changed so that such a manner can be achieved.

The write restriction may be set in only one stage. That is, the second determination and the write prohibition mode may be eliminated.

When the write restriction is set in only one stage, the write prohibition mode may be used instead of the write reduction mode. That is, writing of data to the storage 13 may be prohibited at the time when the first determination is affirmative. In other words, when the first determination is affirmative, the write frequency to the storage 13 may be reduced to 0.

The number of stages of setting the write restriction may be changed depending on the application. For example, a case in which the two-stage write restriction is set as in the above embodiment will be considered. In this case, the two-stage write restriction may be set for a certain application among the second type applications, and a one-stage write restriction may be set for the remaining second type applications. Furthermore, for only one application, the generation mode may be switched from the write reduction mode to the write prohibition mode depending on the second determination.

Applications to be subjected to the write restriction are not limited to the second type applications. For example, the write restriction may be imposed on some of the first type applications. If a basic motion performance of the vehicle 100 is not affected, it is also possible to impose a write restriction on the first type application. For example, if the first type application on which the write restriction is imposed repeatedly writes data from a sensor or other data to the storage 13, the first write reduction method or the second write reduction method can be applied. Furthermore, a write restriction may be imposed on the third type applications. For example, when there is a third type application in which the write time interval of data from a sensor is not constant to the storage 13, the second write reduction method may be applied to the third type application. In addition, for example, when there is a third type application that repeatedly generates some data even if the data is not obtained from a sensor, the first write reduction method or the second write reduction method may be applied to the third application. In addition to the first write reduction method and the second write reduction method, another method capable of reducing a write frequency to the storage 13 may be appropriately adopted.

It is not essential to impose write restrictions on all second type applications. Even in a case in which write restrictions are not imposed on all the second type applications, it is preferable to impose the write restrictions on applications including the first type applications and the third type applications in order to achieve the following matter. The above matter is included in reduction of the write frequency of data to the storage 13 in all of the applications stored in the storage 13.

In a case in which the write restriction is set in multiple stages, the number of applications to which the write restrictions are imposed may be increased instead of switching the data generation mode. For example, when the first determination is affirmative, only some of the second type applications may be set as targets of the write reduction mode, and when the second determination is affirmative, all the second type applications may be set as targets of the write reduction mode. By doing so, the number of applications on which the write restrictions are imposed may be increased while the same generation mode is being used.

The definition of the first prescribed value K1 is not limited to the example of the above embodiment. An appropriate content may be determined as a threshold at which the write restriction needs to be performed. The same applies to the second prescribed value K2. Even in a case in which the write restriction is set in three or more stages, a threshold of each stage may be appropriately set.

The second type application is not limited to the example of the above embodiment. An application meeting the following conditions may be treated as a second type application. That is, the second type applications are applications that are not related to the control of acceleration or braking of the vehicle 100, and are applications that need to repeatedly write data detected or received by a sensor in the storage 13 at certain time intervals. Instead of, or in addition to, the second type application exemplified in the above embodiment, another second type application may be adopted.

The first type application is not limited to the example of the above embodiment. An application that controls acceleration or braking of the vehicle 100 may be treated as a first type application. Instead of, or in addition to, the first type application exemplified in the above embodiment, another first type application may be adopted.

Multiple partitions may be provided in the storage 13. Then, a write restriction similar to that in the above embodiment may be imposed depending on the remaining number of writable times KC to the upper limit number of times for each partition.

In performing the first determination, instead of using the remaining number of writable times KC itself, an index indicating the remaining number of writable times KC may be used. An example of such an index is a value obtained by dividing the remaining number of writable times KC by the upper limit number of times. When such an index is used, it suffices if the first prescribed value K1 is converted into a value suitable for the index. The index and the converted value may be used to determine whether the remaining number of writable times KC is less than or equal to the first prescribed value K1. As described above, the manner of the first determination is not limited to the example of the above embodiment, and only need to be a manner in which whether the remaining number of writable times KC has become the first prescribed value K1 or less can be understood. The same applies to the second determination.

The sensor is not limited to the example of the above embodiment. The sensor only needs to be a device that obtains information. Other sensors may be adopted instead of or in addition to the sensor exemplified in the above embodiment. As the sensor, a sound sensor that detects sound may be adopted. As the sensor, a radar that detects an obstacle or the like using reflection of radio waves may be adopted.

The vehicle 100 may include a motor generator instead of, or in addition to, the engine as the vehicle on-board device 92 serving as a drive source of the vehicle 100.

The specific controller 90 may perform the setting process and the selection process similar to those in the above embodiment.

The configuration of the central controller 10 is not limited to the example in the above-described embodiment. The central controller 10 may be modified as long as it includes a memory as a storage unit that functions in the same manner as that in the above-described embodiment, execution circuitry as an execution unit that functions in the same manner as that in the above-described embodiment, and any one of the following configurations (a) to (c).

(a) The central controller 10 includes one or more processors that execute various processes according to computer programs. The processor includes a CPU and a memory such as RAM and ROM. The memory stores program code or instructions configured to cause the CPU to execute processes. The memory, which is a computer-readable medium, includes any type of media that are accessible by general-purpose computers and dedicated computers (including a non-transitory computer-readable storage medium).

(b) The central controller 10 includes one or more dedicated hardware circuits that execute various processes. The dedicated hardware circuits include, for example, an application specific integrated circuit (ASIC) and a field programmable gate array (FPGA).

(c) The central controller 10 includes a processor that executes part of various processes according to programs and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle information management device, comprising:
execution circuitry; and
a memory, wherein
the memory stores multiple applications, the memory having a number of writable times of data to the memory, and
the execution circuitry is configured to
write the data to the memory in conjunction with execution of each of the applications,
make a determination as to whether a remaining number of writable times to the memory has become a prescribed value or less; and
when the determination is affirmative, reduce a write frequency of data to the memory in conjunction with the execution of each application of the entirety of the applications, as compared with the write frequency in a case in which the determination is negative.

2. The vehicle information management device according to claim 1, wherein
a vehicle on-board sensor is mounted on a vehicle, one of the applications repeatedly writes, to the memory at prescribed time intervals, data obtained by the vehicle on-board sensor in conjunction with execution of the application, and the execution circuitry is configured to, when the determination is affirmative, make the prescribed time intervals longer than the prescribed time intervals in a case in which the determination is negative.

3. The vehicle information management device according to claim 1, wherein a vehicle on-board sensor is mounted on a vehicle, one of the applications repeatedly writes, to the memory, data obtained by the vehicle on-board sensor in conjunction with the execution of the application, and the execution circuitry is configured to, when the determination is affirmative, reduce a size of data written to the memory per write action in conjunction with the execution of the application, as compared with a size of data written to the memory per write action in a case in which the determination is negative.

4. The vehicle information management device according to claim 1, wherein one of the applications is a specific application that controls acceleration or braking of the vehicle in conjunction with the execution of the application, and the execution circuitry is configured to, when the determination is affirmative, reduce the write frequency of the data to the memory in conjunction with execution of an application other than the specific application, as compared with the write frequency in a case in which the determination is negative.

5. The vehicle information management device according to claim 1, wherein the prescribed value is a first prescribed value, a second prescribed value is predetermined as a value less than the first prescribed value, and the execution circuitry is configured to prohibit, for at least one application, the writing the data to the memory in conjunction with the execution of the application when the remaining number of writable times of the number of writable times in the memory is less than or equal to the second prescribed value.

6. A non-transitory computer-readable storage medium that stores a program for causing execution circuitry of a vehicle information management device to execute a vehicle information management process, the vehicle information management process comprising:

writing data to a memory of the vehicle information management device in conjunction with execution of each of multiple applications, the memory storing the applications;

determining whether a remaining number of writable times to the memory has become a prescribed value or less; and reducing, when the determination is affirmative, a write frequency of the data to the memory in conjunction with the execution of each application of the entirety of the applications, as compared with a write frequency in a case in which the determination is negative.

7. A vehicle information management method causing execution circuitry of a vehicle information management device to:

write data to the memory of the vehicle information management device in conjunction with execution of each of multiple applications, the memory storing the applications;

determine whether a remaining number of writable times to the memory has become a prescribed value or less; and reduce, when the determination is affirmative, a write frequency of the data to the memory in conjunction with the execution of each application of the entirety of the applications, as compared with a write frequency in a case in which the determination is negative.

* * * * *